United States Patent [19]

Cordiano

[11] Patent Number: 4,574,907
[45] Date of Patent: Mar. 11, 1986

[54] POWER-ASSISTED RACK-AND-PINION STEERING APPARATUS

[75] Inventor: Ettore Cordiano, Turin, Italy

[73] Assignee: Corint S.r.l., Turin, Italy

[21] Appl. No.: 587,773

[22] Filed: Mar. 9, 1984

[30] Foreign Application Priority Data

Mar. 9, 1983 [IT] Italy .................................. 67269 A/83
Dec. 23, 1983 [IT] Italy .................................. 68352 A/83

[51] Int. Cl.⁴ ............................................. B62D 5/06
[52] U.S. Cl. .................................. 180/148; 74/388 PS
[58] Field of Search ........................ 180/148, 132, 147; 74/498, 388 PS; 91/467, 466; 92/136

[56] References Cited

U.S. PATENT DOCUMENTS 2,909,939  10/1959  Herbenar ..................... 180/148 X

FOREIGN PATENT DOCUMENTS 645808  7/1962  Canada ............................. 180/132
1291230  3/1969  Fed. Rep. of Germany ...... 180/132
819787  9/1959  United Kingdom ............... 180/148

*Primary Examiner*—Harry Tanner
*Attorney, Agent, or Firm*—Sughrue, Mion, Zinn, Macpeak and Seas

[57] ABSTRACT

In a control valve for a power-assisted rack-and-pinion steering apparatus having a slidable member adapted to sense the axial movement of a helical tooth pinion, pre-stressed spring means ensure the return of the slidable member of the valve into its central neutral position, against the friction forces existing in the whole apparatus. These means also avoid intervention of power-assistance below a predetermined value of the torque onto the pinion. In one embodiment of the control valve which operates in connection with a closed center air circuit, means are provided to minimize the friction forces allowing at the same time the use of a simple and inexpensive structure.

11 Claims, 12 Drawing Figures

POWER-ASSISTED RACK-AND-PINION STEERING APPARATUS

The present invention relates to a power-assisted rack-and pinion steering apparatus, of the known-type comprising:
- a casing,
- a rack-engaging helical tooth pinion,
- a shaft connected to said pinion,
- a bearing rotatably supporting said shaft within a cylindrical cavity of the casing, said bearing being slidably mounted within said cylindrical cavity to allow axial displacements of the pinion,
- a control valve having a movable member which is slidably mounted within an auxiliary cavity of the casing,
- transmission means for transforming an axial displacement of the pinion into a displacement of said movable member of the control valve, said means including
- a piston operatively connected to said bearing, with respect to axial displacements of the latter,
- a chamber of variable volume defined within said cylindrical cavity and facing said piston, said chamber being filled with a deformable and substantially incompressible material,
- a push-rod operatively connected to said movable member of the control valve, having one end surface arranged so as to sense the pressure within said chamber of variable volume,
- first spring means urging said bearing and said piston towards the chamber of variable volume,
- second spring means urging said movable member and said push-rod towards the chamber of variable volume.

An apparatus of the above type is known from EP-A-O No. 078 879. In this known solution, a rubber element is located within the said chamber of variable volume, so that the rubber of this element acts as the said deformable and substantially incompressible material. When a torque is transmitted by the steering wheel to the rack-engaging pinion, the latter receives an axial thrust from the rack, because of the inclination of its teeth. Depending upon such axial thrust, the pressure exerted by the material within the chamber of variable volume onto the push-rod varies, which results in a corresponding variation of the position of the valve movable member. The above mentioned first and second spring means keep the material within chamber of variable volume under pressure and hold the movable member in a central neutral position when the torque applied to the pinion is zero. In a co-pending application Ser. No. 587,768, filed Mar. 9, 1984, filed by the applicant simultaneously with the present application, an apparatus of the above type is also disclosed, wherein the said deformable and substantially incompressible material is a fluid, preferably oil or grease.

Studies and tests conducted by the Applicant have shown that friction forces existing in the whole apparatus for the movement of the same pinion, the valve and the transmission means which are interposed between the pinion and the valve movable member may prevent the latter to be returned to its central neutral position when the torque applied to the pinion returns to zero.

The main object of the present invention is to avoid this drawback, while providing an apparatus having a structure simpler and less costly with respect to the previously proposed solutions.

According to the invention, there is provided a power-assisted rack-and-pinion steering apparatus of the above mentioned known type, characterised in that said apparatus further includes auxiliary pre-stressed spring means for returning the movable member of said control valve to a central neutral position, against the friction forces existing in the whole apparatus, when the torque applied to said pinion returns to zero, and for preventing said movable member to be displaced from said central neutral position when the torque applied to the pinion is below a pre-determined value.

Thus, the return of the movable member to its central neutral position is ensured and the further advantage is obtained that at low torques, as for instance during turns of great radius at high speed, the power-assistance is very low or zero at all, and the driver has the full feeling of the forces transmitted by the ground to the wheels.

The present invention may be advantageously applied to apparatus having a control valve operating either with oil or air. In both cases, the control valve has the function to control the pressure head between two chambers of an actuator assisting the rack of the apparatus during its axial displacement. As it is generally known, the apparatus is further provided with a pump driven by the vehicle engine, and consisting of the same engine in case the vacuum within the intake manifold of a gasoline engine is used. The fluid circuit associated with the control valve may be either of the so-called "closed centre" type or of the so-called "open centre" type. In the former case, fluid flows through the circuit only when the apparatus is activated. When the torque applied to the pinion is zero, both chambers of the actuator are connected to the low or the high pressure fluid sorce. When a torque is applied to the pinion, each chamber is connected to a different source and only the amount of fluid is used which is necessary for the steering maneuver. In an "open center" power-steering circuit, on the contrary, fluid continuously flows through the pump, the control valve and the actuator chambers. When the apparatus is activated, the communication of one of the actuator chambers to the pump is closed and the communication of the other chamber to a recevoir is throttled, so that the pressure in this latter chamber increases.

An apparatus of the known type indicated at the beginning of the present specification which operates with air and has a power steering circuit of the "closed center" type is known from EP-A-O No. 078 878. In this known solution, the movable member of the control valve includes a central core and an outer rim which is axially movable relative to said core; the apparatus further includes a resiliently deformable diaphragm connecting the outer rim to the wall of the valve cavity and pre-stressed spring means interposed between the outer rim and stop means carried by the central core, to hold the rim in a fixed position relative to the central core when the difference between the pressures acting onto the diaphragm faces is below a pre-determined value. This arrangement allows a more rapid increase of the power-assistance force to be obtained when the torque onto the pinion exceeds a pre-determined value.

Tests conducted by the Applicant have shown that also in this case the friction of the device, namely the friction generated by a sealing means interposed between the central core and the outer rim of the valve movable member may render incontrollable and erratic the valve operation.

In order to avoid the above mentioned further drawback, there is provided according to the present invention, a power-assisted rack-and-pinion steering apparatus as defined above, wherein said control valve is associated to a closed center air circuit, wherein the movable member includes a central core and an outer rim which is axially movable relative to said core, and wherein the apparatus further includes a resiliently deformable diaphragm connecting said outer rim to the wall of the valve cavity, and pre-stressed spring means interposed between said outer rim and stop means carried by said central core, so as to hold the outer rim in a fixed position relative to the central core when the difference between pressures acting onto the diaphragm faces is below a pre-determined value, said apparatus being further characterized in that said diaphragm is centrally connected to said central core of the movable member and in that said outer rim is formed by a rigid part of said diaphragm, having a position intermediate between the central core and the wall of the valve cavity.

Thus, any friction between the outer rim and the inner core is eliminated.

Further advantages and features of the present invention will become apparent from the following description of some preferred embodiments thereof as illustrated in the annexed drawings.

Figure 1:
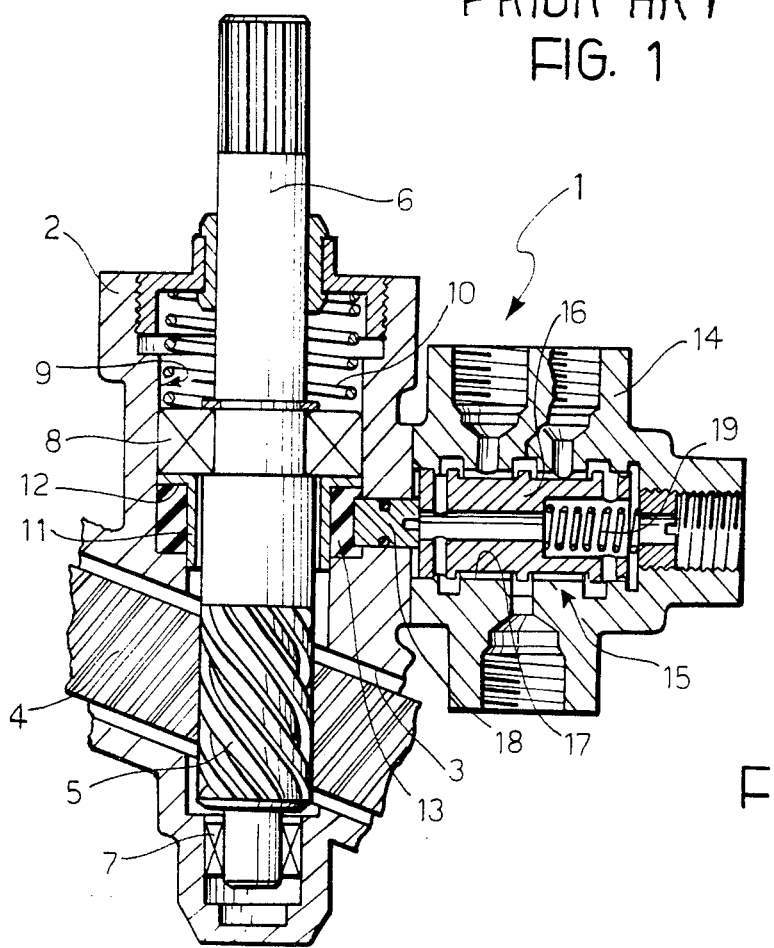
FIG. 1 shows a power-assisted rack-and-pinion steering apparatus according to the prior art.

FIG. 1 of the annexed drawings shows a known power-assisted rack-and-pinion steering apparatus, which is disclosed in EP-A-O No. 078 879. Such apparatus, indicated by reference numeral 1 in FIG. 1, includes a steering gear casing 2 having a passage 3 for a steering rack 4. A rack-engaging helical tooth pinion 5 forms part of a shaft 6 which is driven by the steering wheel via a known transmission (not illustrated). Shaft 6 is rotatably mounted within the casing 2 by means of the bearings 7, 8 which both allow axial displacements of the pinion 5 relative to the casing. Bearing 8 is slidably mounted within a cylindrical cavity 9 of the casing 2 and is urged by a spring 10 against an annular piston 11 which is arranged around the shaft 6. Piston 11 and the wall of the cylindrical cavity 9 define an annular chamber 12 of variable volume, wherein a rubber annular element 13 is located. A casing 14 is associated to the steering gear casing 2, the casing 14 forming the body of a control valve 15 of the power-assisted steering apparatus. Control valve 15 is connected to an open center oil circuit and includes a movable member 16 which is slidably mounted within an auxiliary cavity 17 having an axis different from, and preferably orthogonal to the axis of the shaft 6. A push-rod 18 is slidably mounted within casing 2 along the axis of the auxiliary cavity 17. Push-rod 18 is interposed between the annular rubber element 13 and the movable member 16, the latter being urged against push-rod 18 by a spring 19. Spring 10 and spring 19 keep the annular rubber element 13 under pressure and hold the movable member 16 in a center neutral position (illustrated in FIG. 1) when no torque is applied to the pinion 5. When a torque is applied to the pinion, this is caused to move axially, because of the inclination of its helical teeth. This results in a different pressure exerted by piston 11 onto the annular rubber element 13, which causes movement of the movable member 16 of the control valve from its central neutral position.

As mentioned above, such known solution has the drawback that the friction forces existing in the whole apparatus for the movement of pinion 5, the valve and the transmission mechanism interposed between pinion 5 and movable member 16 may prevent movable member 16 from returning to its central neutral position when the torque applied to the pinion returns to zero. This drawback is also present, even if reduced, in case the chamber of variable volume is filled with a fluid, such as oil or grease, instead of rubber, as it is disclosed in a co-pending application filed by the same Applicant simultaneously with the present application. In this latter case, the chamber of variable volume 12 must be isolated from the remaining part of the cylindrical cavity 9 and the sealing means (as those which will be illustrated hereinafter with reference to FIG. 2), associated to piston 11 and push-rod 18, result in further friction forces which are added to the other friction forces existing in the apparatus for the movement of the various components.

Figure 2:
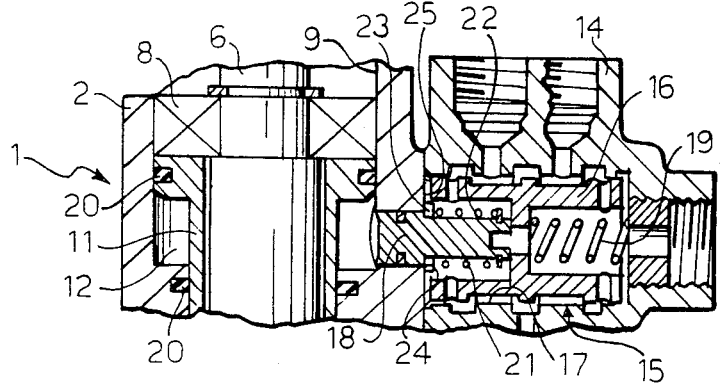
FIG. 2 shows a first embodiment of the apparatus according to the present invention.

FIG. 2 shows a first embodiment of the apparatus according to the present invention which avoids the above mentioned drawbacks. In such figure, parts which are common to FIG. 1 are indicated by the same reference numeral.

FIG. 2 shows a partial view of the apparatus, the non-illustrated parts being identical to the corresponding parts of FIG. 1. A first difference with respect to FIG. 1 lies in that the annular rubber element 13 has been eliminated and the chamber 12 is filled with oil. As mentioned above, this feature is disclosed in a co-pending application of the same Applicant and does not form part of the present invention. In order to isolate chamber 12 from the remaining part of the cylindrical cavity 9, two annular rings 20 are associated to the piston 11.

A further and most important difference of the apparatus of FIG. 2 with respect to that of FIG. 1 lies in that an auxiliary pre-stressed spring 21 is associated to the push-rod 18. The auxiliary spring 21 is interposed between a stop ring 22 carried by push-rod 18 and a washer 23 which is slidably mounted on the push-rod 18 and abuts against a shoulder 24 of the push-rod. Spring 19 urges push-rod 18 towards the chamber 12 so as to hold the washer 23 against an inner wall 25 of the casing.

If $Q_O$ is the load of the spring 21 when the washer 23 is in contact with shoulder 24, and $P_O$ is the force exerted onto the push-rod 18 by the oil within chamber 12 when the torque applied onto the pinion 5 is zero, spring 19 is arranged so as to have a load $Q=P_O+Q_O/2$ when the movable member 16 is in its central neutral position. Thus, when the torque onto the pinion is zero, the movable member 16 is in its central neutral position and washer 23 is pressed against the wall 25 by a force equal to $Q_O/2$. If a torque is applied onto the pinion 5 in the direction which causes an increase of pressure within chamber 12, push-rod 18 will move rightwardly (with reference to FIG. 2) only when the force exerted by the oil within chamber 12 onto push-rod 18 exceeds the values $P=_1P_O+Q_O/2$. In the same manner, if the torque applied to pinion 5 tends to cause a decrease in pressure within chamber 12, push-rod 18 will move leftwardly (with reference to FIG. 2) only when the force exerted by the oil within chamber 12 onto push-rod 18 becomes lower than the value $P_2=P_O-Q_O/2$. Thus, there is no intervention of the control valve 15 if the torque applied onto the pinion remains below a pre-determined value. Therefore, spring 21 allows the driver to have a better control of the vehicle at high speed, when normally the torques applied to the pinion are rather small. But the main advantages resulting from the use of the auxiliary pre-stressed spring 21 is that it ensures, once the movable member 16 has been moved from its central neutral position, that the same returns to such position when the torque applied to the pinion returns to zero, in spite of the friction forces generated by movement of the various components of the apparatus.

Figure 3:
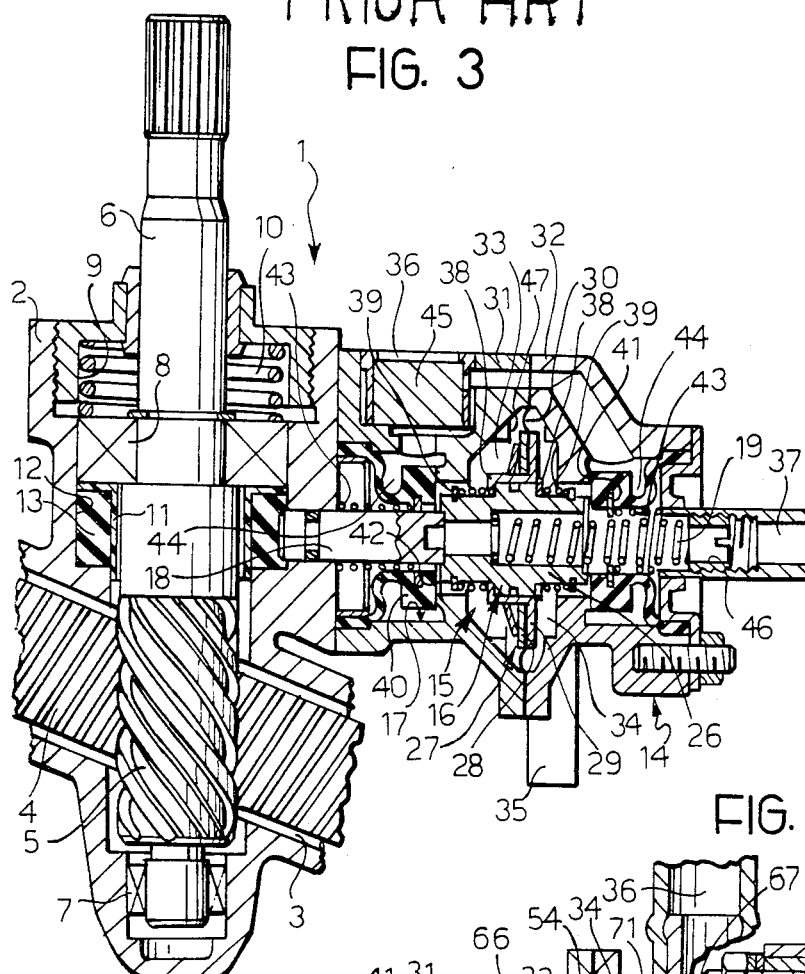
FIG. 3 shows another apparatus according to the prior art.

FIG. 3 of the annexed drawing shows another apparatus according to the prior art, which is known from EP-A-O No. 078 878. The main difference of the apparatus illustrated in FIG. 3 with respect to the other known apparatus illustrated in FIG. 1 lies in that the apparatus of FIG. 3 is provided with a control valve 15 which is associated to a closed center air circuit. The movable member 16 includes an inner core 26 and an outer rim 27 which is slidably mounted relative to the inner core 26. The outer rim 27 includes two metal annular plates 28, 29 which clamp the central portion of an annular resiliently deformable diaphragm 30, whose periphery is interposed between two portions 31, 32 of the valve body 14. The rim 27 and diaphragm 30 define two chambers 33, 34 within the auxiliary cavity of the valve these chambers being connected via two ducts 35 (only one of which is illustrated in FIG. 3) to the two chambers of an actuator (not illustrated) which assists the movement of the rack 4. The valve 15 is provided with a high pressure port 36 and a low pressure port 37 which are respectively connected to atmospheric pressure and to a vacuum source, such as the intake manifold of the vehicle engine. The metal annular plate 29 forming part of the outer rim 27 has a hub slidably mounted onto the central core 26, whose end faces abut against two washers 38 which are also slidably mounted onto the central core 26. Two pre-stressed springs 39 are provided, each interposed between a respective washer 38 and a respective stop ring 39 fixed to the central core 26. Valve 15 further includes two rubber bellows, 40, 41, each having one end fixed to the casing and bearing at the other end a flange portion which is biased against an annular shoulder 42 by a respective spring 43. Thus, in the rest condition, the flange portion of bellows 40, 41, seal chambers 33, 34, from two high pressure chambers 44 which are in communication with high pressure port 36 via a filter 45. As shown, the inner core 26 of the movable member 16 is hollow, its cavity being in communication with low pressure port 37.

Spring 19 is interposed between an inner shoulder of core 26 and a spring adjusting element 46 screwed within a fixed tubular part which defines port 37. The known apparatus described above with reference to FIG. 3 operates as follows: when the valve movable member 16 is in its center neutral position, its end faces are spaced part from the flange portions of bellows 40, 41, so that low pressure port 37 is connected to the two chambers 33, 34 (chamber 33 is connected to the inner cavity of core 26 through a notching on the end face of push-rod 18). As mentioned above, chambers 34 which surrounds the bellows 40, 41 are always in communication with the atmosphere. When a torque is applied to the steering wheel and hence to the pinion, the latter is axially pushed, as in the case of the apparatus of FIGS. 1, 2, causing a variation of the pressure in the rubber annular element 13 within the chamber of variable volume 12. It is to be noted that the following description applies also the case in which a fluid, such as oil or grease, is disposed within chamber 12 instead of the rubber element 13. The variation of the pressure within chamber 12 causes a movement of push-rod 18 which is transmitted to the central core 26 of the movable member 16. Supposing for example that the movable member 16 is pushed rightwardly with reference to FIG. 3, such member moves in such direction until it abuts against the flange portion of the bellow 41, detaching it from the annular shoulder 42. In this condition, air at atmospheric pressure enters into chamber 34 thus causing a pressure increase in the corresponding chamber of the rack-assisting actuator. When the pressure head between the two chambers 33, 34 reaches a sufficient value, the movable member 16 moves back leftwardly and the passage between the flange portion of bellow 41 and the shoulder 42 closes again. The power-assistance force generated by the actuator which is associated to the above described control valve increases according to a linear function of the torque applied to the steering wheel. When the pressure head between chambers 33, 34 reaches a value whereby the thrust onto the outer rim 27 becomes equal to the force of spring 39, the outer ring 27 moves leftwardly until it abuts against projections 47 of the wall of the valve cavity. From this point onwards the power-assistance force of the actuator rapidly raises as the torque onto the pinion increases. Under these conditions, in fact, the active surface of the movable member which is exposed to the differential pressure is reduced and large increases in pressure are necessary in response to even small increases in the thrust of the push-rod.

The known apparatus shown in FIG. 3 has the same drawback mentioned with reference to FIG. 1, i.e. the friction forces existing in the apparatus may prevent the movable member to be returned to its central neutral position, when the thrust applied to the pinion returns to zero. Moreover, the apparatus of FIG. 3 has the further drawback that the friction between the central core 26 and the outer rim 27 (due also to the presence of the sealing means on the core) may render incontrollable and erratic the valve operation. Such friction between core 26 and rim 27 has a particular importance in valves for power-steering apparatus operating with air at low pressure or with vacuum, because no lubrication exists between core and rim and the frictions forces have the same order of magnitude of the recall forces of spring and pressure acting on the movable member.

Figure 4:
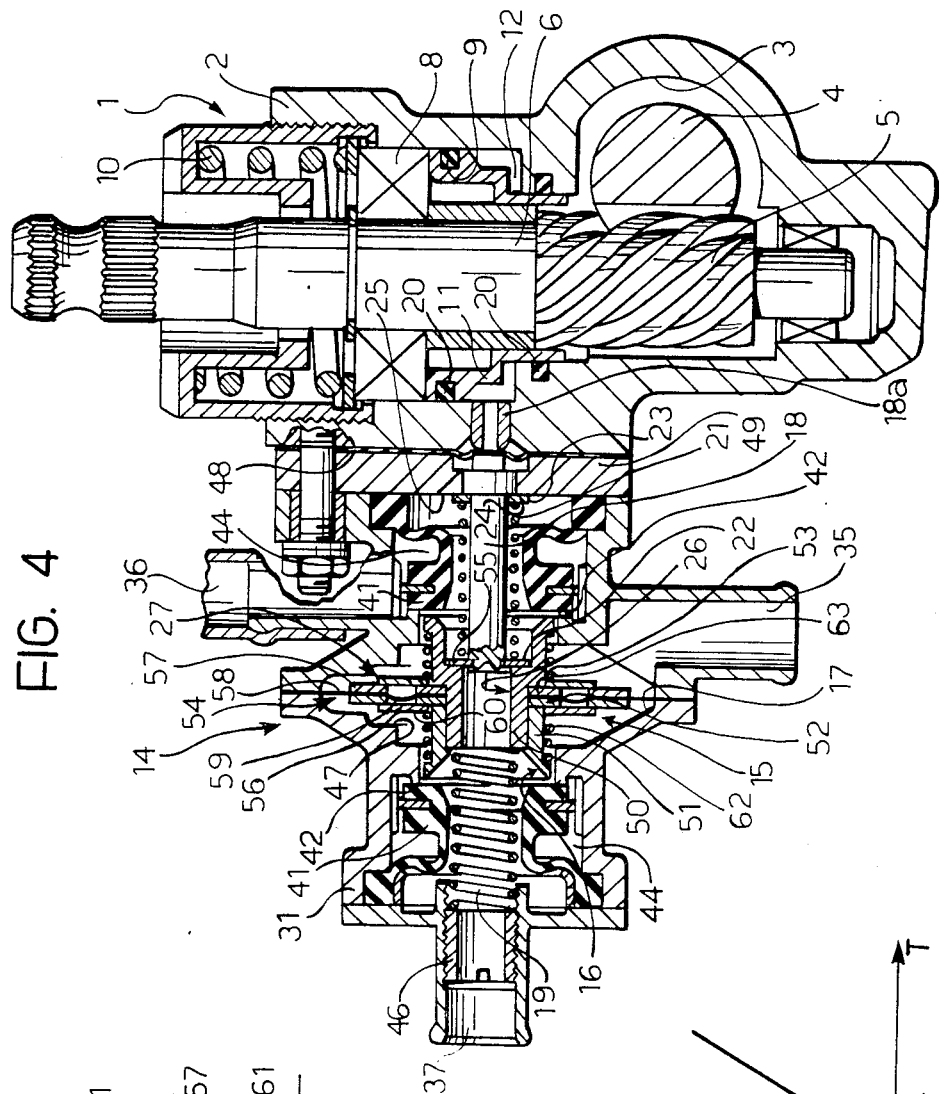
FIG. 4 shows a second embodiment of the apparatus according to the present invention.

The above mentioned drawbacks of the apparatus of FIG. 3 have been completely eliminated in the embodiment of the present invention which is shown in FIG. 4. In this figure, parts which are common to FIG. 3 are indicated by the same reference numeral. A first difference with respect to the known apparatus of FIG. 3 lies in that the chamber of variable volume 12 is filled with a fluid, such oil or grease. As mentioned above, such feature is also disclosed in a co-pending application of the same Applicant and does not form part of the present invention.

As shown in FIG. 4, an auxiliary plunger 18a is interposed between the push-rod 18 and the chamber of variable volume 12, while push-rod 18 co-operates with the central portion of a diaphragm 48 whose peripheral portion is clamped between the steering gear casing 2 and a plate 49 disposed between the steering gear casing 2 and the valve body portion 32. Also the above arrangement is disclosed in the above mentioned copending application and does not form part of the present invention.

A further difference of the embodiment of the invention shown in FIG. 4 with respect to the known apparatus of FIG. 3 lies in that as in the case of FIG. 2, an auxiliary pre-stressed spring 21 is associated to the push-rod 18. Also in this case, spring 21 is interposed between a stop ring 22 carried by the push-rod 18 and a shoulder 24 of the push-rod 18. In the rest condition washer 23 is pressed by spring 19 against a wall 25 of the cavity of the valve body. The loads of springs 21, 19 are chosen in the way described above with reference to FIG. 2, so that spring 21 prevents activation of the control valve 15 when the torque applied to the pinion 5 is below a pre-determined value. Thus, the above mentioned advantage of ensuring the return of the movable member 16 to its central neutral position is achieved.

Another and most important difference with respect to the apparatus of FIG. 3 lies in the particular structure and arrangement of the central core 26 and outer rim 27 of the movable member 16. In the case of FIG. 4, the central core 26 of the movable member 16 includes inner and outer members 50, 51 and two rings 52, 53 which clamp the central portion of a resiliently deformable diaphragm 54 whose peripheral portion is engaged between the valve body portions 31, 32. The above mentioned stop ring 22 abuts against a shoulder of the core inner member 50 and is provided with notchings 55 for air passage. In the embodiment of FIG. 4, the outer rim of the movable member 16 is made up of a portion of the same diaphragm 54 which is stiffened by means of annular elements 56, 57 the inner and outer equivalent diameters of the outer rim being the mean diameters of the diaphragm deformable portions 58 and 59 respectively. Auxiliary washers 60, 61 are slidably mounted onto the central core of the movable member and are urged against the washers 56, 57 by springs 62, 63 having the same function of springs 39 of FIG. 3.

By such an arrangement, the apparatus of FIG. 4 has a movable member including an outer rim axially movable relative to the core as in the known apparatus of FIG. 3, but any friction in the relative movement is fully eliminated because no sliding exists between the two elements. The operation of the control valve of the apparatus of FIG. 4 is identical to that of FIG. 3, apart from the above described effect due to the presence of spring 21. As previously stated, the adjusting element 46 must be positioned in such a way that when the torque applied to the pinion 5 is zero, spring 19 has a load equal to the sum of half the load of the push-rod spring 21, plus the thrust of diaphragm 48 against the push-rod at zero torque.

Figure 12:
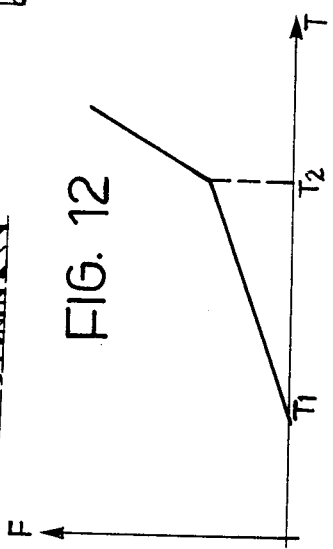
FIG. 12 is a diagram showing the operation of the valve of FIG. 4.

FIG. 12 shows a diagram illustrating the operation of the apparatus of FIG. 4. In particular, the diagram of FIG. 12 shows the values of the power-assisting force F acting onto the rack 4 for various values of the torque T on the steering wheel of the vehicle. As shown, no power-assisting force is present when the torque is below a pre-determined value $T_1$.

This is due to the presence of spring 21. When the torque exceeds the value $T_1$ the power-assisting force increases according to a linear function of T. When the Torque exceeds a second higher pre-determined value $T_2$ the linear increase of the power-assisting force becomes more rapid, due to the relative movement between the central core 26 and the outer rim of the valve movable member.

FIGS. 5-11 show variants and details of the valve of FIG. 4. In such figures, parts which are common to the figures which have been described above are indicated by the same reference numerals.

Figure 5:
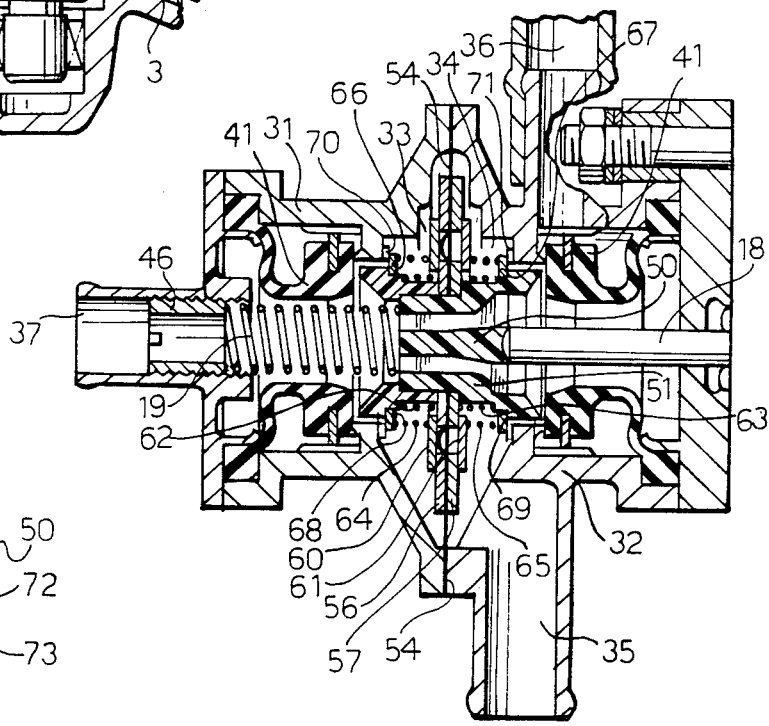
FIG. 5 shows a variant of FIG. 3.
Figure 6:
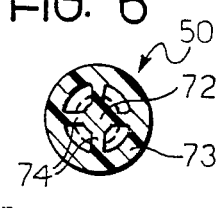
FIG. 6 shows a detail of FIG. 5.

FIG. 5 shows a variant of FIG. 4, wherein the auxiliary pre-stressed spring 21 is replaced by two pre-stressed springs 64, 65 associated to the inner core of the valve movable member 16. Springs 64, 65 urge, on one end, upon the auxiliary washers 60, 61 which hold the outer rim 56, 57 and, on the other and, upon two rings 66, 67 which are slidably mounted onto the central core 26 and abut against shoulders 68, 69 of the same core. The position of said shoulders is such that, when the movable member is in its central neutral position, rings 66, 67 are in contact with projections 70, 71 of the inner wall of the valve body. As a consequence of the above structure, the movable member of the valve moves from its position when it is pushed by a force greater than the pre-stress of springs 64, 65. Obviously, in such solution, the load of spring 62, 63 must be determined by taking into account also springs 64, 65 acting against washers 60, 61. Furthermore, since the spring 21 on the push-rod 18 has been eliminated, spring 19 must have only the load necessary to balance the pressure applied by diaphragm 48 when the torque onto the pinion 5 is zero. In the embodiment of FIG. 5, push-rod 18 is in form of a pin interposed between diaphragm 48 and an abutment of the inner member 50 of the valve movable member 16. As shown in FIG. 6, which illustrates a cross-sectional view of the inner member 50, such member includes a central stem 72 and an outer cylindrical wall 73 connected to stem 72 by four radial ribs 74. Member 50 is preferably made of plastic. In this case, outer member 51 is fixed to inner member 50 by means of ultrasonic welding or by glueing.

Figure 7:
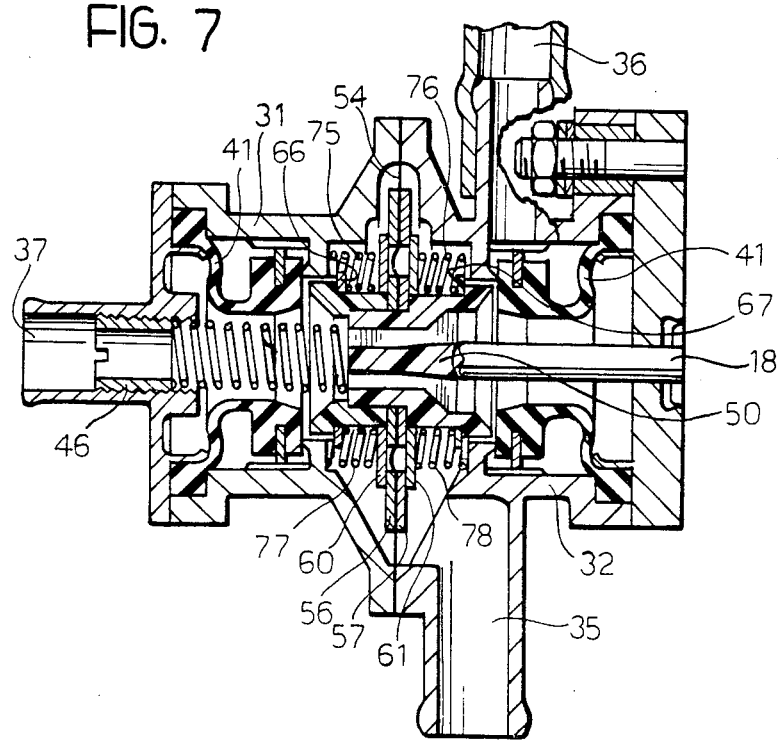
FIG. 7 shows a variant of FIG. 5.

FIG. 7 shows an apparatus similar to that of FIG. 5, which differs from the latter for a different arrangement of the springs which are associated to the valve movable member. In this case two inner springs 75, 76 are provided which have the same function of springs 64, 65 of FIG. 5 and serve in particular to return the movable member to its central neutral position and to prevent the movable member from displacing from such position before the torque reaches a pre-determined value. Outer springs 77, 78 are provided which, together with springs 75, 76, ensure that the outer rim of the valve movable member moves relative to the central core only when the pressure head reaches a pre-determined value. As opposite to FIG. 4, in this case springs 77, 78 react against the inner wall of the valve body instead of reacting against shoulders of the central core 26. By this arrangement, the same power-assistance law can be obtained as in the case of FIG. 4 by suitably dimensioning the springs and the diameters of the various components.

Figure 8:
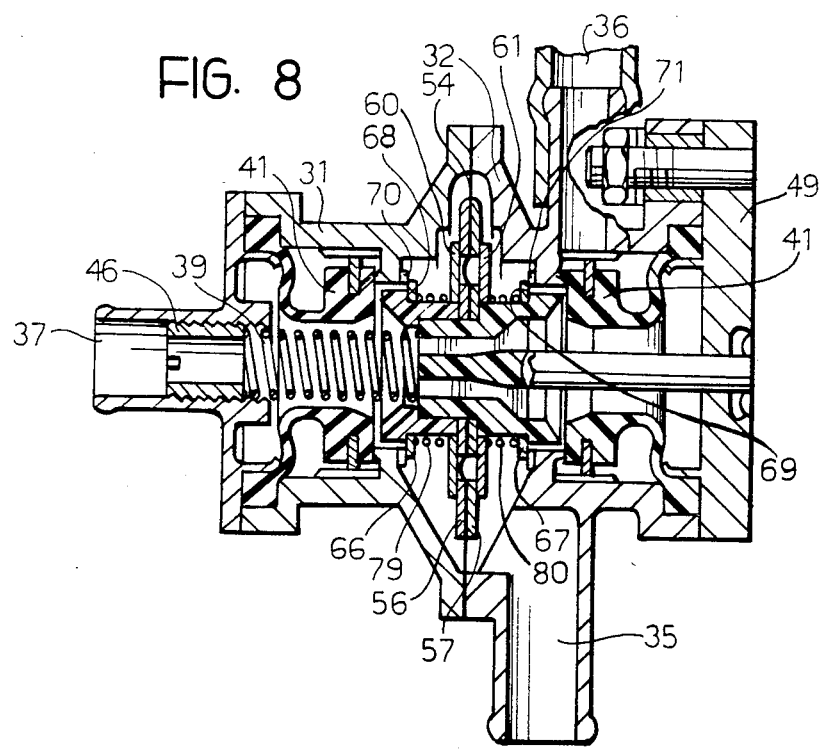
FIG. 8 shows a variant of FIG. 5.

FIG. 8 shows a further variation of the apparatus of FIG. 4, wherein a single pair of springs 79, 80 takes both functions, i.e. the function of ensuring the return of the movable member to its central neutral position and of delaying movement of the movable member from such position until the torque reaches a first predetermined value, as well as the function of enabling the relative movement of the outer rim relative to the central core of the movable member when the torque exceeds a second higher pre-determined value. While such solution is clearly simpler than the other above described solution, it cannot be always adopted since it constraints the valve dimensioning and sometimes may not permit to obtain the desired law of variation of the power-assistance force versus torque.

Figure 9:
FIG. 9 shows a possible embodiment of a detail of the apparatus according to the invention.

FIG. 9 shows, in an enlarged scale, one of the possible solution for fastening the two stiffening annular plates 60, 61 which are associated to the diaphragm 54. In this solution the above elements are made of plastics and are alternatively provided with pins and holes so to allow their mutual engagement. The diaphragm 54 has holes for passage of the pins. After assembling, the pins may be either upset or ultrasonic welded.

Figure 10:
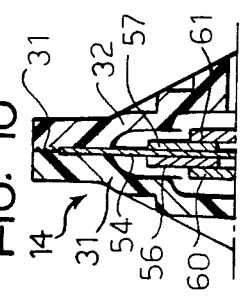
FIG. 10 shows a possible embodiment of another detail of the apparatus according to the present invention.

In FIG. 10 a possible solution is shown for the junction of two plastic valve body portion by an ultrasonic welding in correspondence with an annular rim 81 disposed outwardly of the peripheral edge of the diaphragm.

Figure 11:
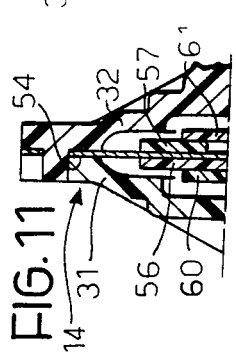
FIG. 11 shows a variant of FIG. 10.

FIG. 11 shows another kind of junction between two plastic body portions, by ultrasonic welding or upsetting of pins formed on the flanges, in a way similar to the solution shown in FIG. 9.

While the invention has been particularly shown and described with reference to some preferred embodiments thereof, it will be understood by those skilled in the art that various changes in form and details may be made therein without departing from the spirit and scope of the invention.

I claim:

1. A power-assisted rack-and-pinion steering apparatus, comprising
a casing,
a rack-engaging helical tooth pinion,
a shaft connected to said pinion,
a bearing rotatably supporting said shaft within a cylindrical cavity of the casing, said bearing being slidably mounted within said cylindrical cavity to allow axial displacements of the pinion,
a control valve having a movable member which is slidably mounted within an auxiliary cavity of the casing,
transmission means for transforming an axial displacement of the pinion into a displacement of said movable member of the control valve, said means including
a piston operatively connected to said bearing with respect to axial displacements of the latter,
a chamber of variable volume defined within said cylindrical cavity and facing said piston, said chamber being filled with a deformable and substantially incompressible material,
a push-rod operatively connected to said movable member of the control valve, having one end surface arranged so as to sense the pressure within said chamber of variable volume,
first spring means urging said bearing and said piston towards the chamber of variable volume,
second spring means urging said movable member and said push-rod towards the chamber of variable volume, and
auxiliary pre-stressed spring means for returning the movable member of said control valve to a central neutral position, against the friction forces existing in the whole apparatus, when the torque applied onto said pinion returns to zero, and for preventing said movable member from being displaced from said central neutral position when the torque applied to the pinion is below a predetermined value, wherein said control valve is associated to a closed center air circuit, and wherein the movable member includes a central core and outer rim which is axially movable relative to said core and wherein the apparatus further includes a resiliently deformable diaphragm connecting said outer rim to the wall of the valve cavity and pre-stressed spring means for holding said outer rim in a fixed position relative to the central core when the difference of pressure acting onto the diaphragm faces is below a predetermined value, wherein the outer rim of the movable member is formed by the diaphragm itself by extending said diaphragm from the wall of the valve cavity up to the core and by stiffening by proper means a portion of the diaphragm in a position intermediate between the central core and the wall of the valve cavity.

2. A power-assisted rack-and-pinion steering apparatus according to claim 1, wherein said rigid part is formed by two annular elements fixed to the two opposite faces of the diaphragm.

3. A power-assisted rack-and-pinion steering apparatus according to claim 2, wherein the said annular elements are fixed to the diaphragm by glueing.

4. A power-assisted rack-and-pinion steering apparatus according to claim 2, wherein said annular elements are made of plastics and are provided with interengaging pins and holes, said elements being fixed to each other by upsetting or by ultrasonic welding of said pins.

5. A power-assisted rack-and-pinion steering apparatus according to claim 1, said central core of the movable member includes inner and outer members which clamp the central portion of said diaphragm therebetween, said inner member being provided with axial passages for the air and an inner abutment element for said push-rod.

6. A power-assisted rack-and-pinion steering apparatus according to claim 5, wherein said inner and outer members are made of plastics, and are fixed to each other by glueing or ultrasonic welding the central portion of the diaphragm being clamped by two rings axially interposed between said inner and outer members.

7. A power-assisted rack-and-pinion steering apparatus according to claim 1, wherein the valve casing includes two casing portions having contact flanges between which the said diaphragm is clamped, said flanges being fixed to each other by means of bolts or rivets or, in case of plastic casing portions, by ultrasonic welding, said welding being made either on an annular surface of the flanges disposed outwardly of the peripheral edge of the diaphragm, or between interengaging pins and holes formed on the same flanges.

8. A power-assisted rack-and-pinion steering apparatus according to claim 1 wherein said pre-stressed spring means for holding said rigid part in a fixed position relative to the central core when the pressure head is below a predetermined value consist of two pre-stressed springs disposed on each side of said rigid part and reacting on one end against corresponding shoulders of said central core and, on the other end, urging upon two slidable washers which are biased against said rigid part and against two abutment projections provided on the middle portion of said central core.

9. A power-assisted rack-and-pinion steering apparatus according to claim 8, wherein said pre-stressed springs for holding said rigid part in a fixed position relative to the central core react against shoulders of the same core, through two further washers which are slidably mounted relative to the core, said further washers being also in contact with two projections of the inner wall of the valve cavity, when the movable member is in its central neutral position.

10. A power-assisted rack-and-pinion steering apparatus according to claim 9, wherein each of said two slidable washers holding said rigid part is urged by a second spring which reacts against a further shoulder formed on the central core of the movable member.

11. A power-assisted rack-and-pinion steering apparatus according to claim 9, wherein each of the two washers for holding said rigid part in a fixed position relative to the central core of the movable member is urged by a second spring which reacts against an inner wall of the casing.

* * * * *